United States Patent [19]

Gulbrandson

[11] Patent Number: 5,018,676
[45] Date of Patent: May 28, 1991

[54] ARMATURE WINDING ARRANGEMENT AND METHOD FOR ELECTRICAL MACHINE

[75] Inventor: William E. Gulbrandson, Clear Lake, Minn.

[73] Assignee: Onan Corporation, Minneapolis, Minn.

[21] Appl. No.: 406,841

[22] Filed: Sep. 13, 1989

Related U.S. Application Data

[63] Continuation of Ser. No. 103,422, Sep. 30, 1987, abandoned.

[51] Int. Cl.$^5$ .............................................. H02K 15/09
[52] U.S. Cl. ..................................... 242/7.03; 29/598; 242/7.05 R; 310/198
[58] Field of Search ............... 242/7.02, 7.03, 7.05 R, 242/7.05 A, 7.05 B, 7.05 C; 310/198, 208; 29/598

[56] References Cited

U.S. PATENT DOCUMENTS

| | | | |
|---|---|---|---|
| 2,714,174 | 7/1955 | Applegate | 242/7.03 X |
| 2,779,886 | 1/1957 | Hunsdorf | 242/7.03 X |
| 3,432,707 | 3/1969 | Peters et al. | 310/208 X |
| 3,949,253 | 4/1976 | Broadway et al. | 310/198 X |
| 3,979,618 | 9/1976 | Auinger | 310/198 |
| 4,121,148 | 10/1978 | Platzer | 322/59 |
| 4,399,843 | 8/1983 | Sedgewick | 242/7.03 X |

FOREIGN PATENT DOCUMENTS

| | | |
|---|---|---|
| 114239 | 10/1900 | Fed. Rep. of Germany . |
| 2741415 | 3/1979 | Fed. Rep. of Germany . |
| 3035136 | 3/1982 | Fed. Rep. of Germany . |
| 1317766 | 2/1963 | France . |

Primary Examiner—Joseph J. Hail, III
Attorney, Agent, or Firm—Merchant, Gould, Smith, Edell, Welter & Schmidt

[57] ABSTRACT

The present invention relates to armature windings. Individual coils (100) of a group of coils (105) are disposed in slots (203) of an armature such that a first sub-group of coils (100a) are wound in a first direction and second sub-group of coils (100b) are wound in a second direction opposite the first direction.

5 Claims, 11 Drawing Sheets

ARMATURE WINDING ARRANGEMENT AND METHOD FOR ELECTRICAL MACHINE

This is a continuation of application Ser. No. 103,422, filed Sept. 30, 1987, now abandoned.

FIELD OF THE INVENTION

Electrical machines are commonly designed to use electrical conductors, herein referred to as wires, wrapped in the slots of an armature in such a way as to obtain a desired voltage, current, flux concentration and waveform. The present invention is directed to the arrangement and configuration in which the wires are wrapped in the slots of the armature.

BACKGROUND OF THE INVENTION

Typically, an armature winding contains one or more coil groups such that the shortest distance from the positive slot for a given coil, and the negative slot for a given coil, is in the same direction for every coil of a group. The present invention is directed to reversing a number of the coils, thereby changing the direction of the shortest distance from the positive to the negative slot. This provides for greater efficiency and reduced material requirements. The present invention solves many problems associated with existing armature windings.

SUMMARY OF THE INVENTION

The present invention is directed to the positioning of coils on an armature for an electrical machine. The invention utilizes the fact that the sections of windings outside of the slots do not substantially affect the magnetic field, nor does the order in which the coils are placed in the slots substantially affect the magnetic field. The invention includes reversing the direction that one or more coils are wound within a group of coils. This results in decreasing the mechanical span (the distance from the positive to the negative slot for a coil), but maintaining the same effective span, which in turn reduces the amount of wire necessary to wind the armature. For purposes of this application, the effective span is defined as the distance from the first slot of a series of sequentially occurring positive slots in a coil group, across the slots of that series to the first slot of a series of sequentially occurring negative slots in the same coil group. Other important effects are that the armature resistance is reduced and that there is less loss in the winding. The overall effect is that the machine is more efficient, and fewer raw materials are required to produce the electrical machine.

This invention will be explained with reference to one phase alternating current machines having two poles. However, those skilled in the art will recognize that this invention applies equally to direct current and polyphase alternating current electrical machines having two or more poles. The invention also applies to electrical machines that use bars or multi-layered coils. Furthermore, the invention may be applied to all types of windings; some of the common types of winding being lap windings, wave winding and concentric windings.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof and to the accompanying descriptive matter in which there is illustrated and described an embodiment of the invention.

BRIEF DESCRIPTION OF THE DRAWINGS

In the Figures, in which corresponding reference numerals and letters indicate corresponding parts throughout.

DETAILED DESCRIPTION OF THE PREFERRED EMBODIMENT

Figure 1A:
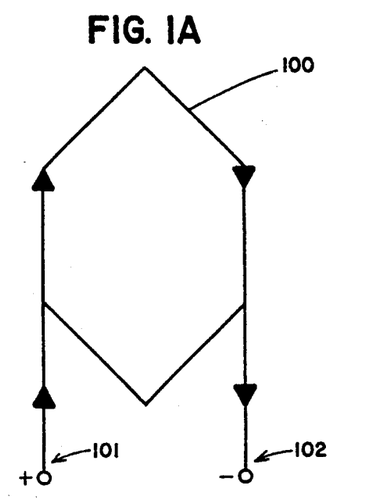
FIG. 1A depicts in diagrammatic linear form a single coil used to wind an armature.

Referring now to the drawings, wherein like reference numerals refer to identical or corresponding components throughout the several views, and more particularly to FIG. 1, a coil 100 used in an armature winding is depicted. For the purposes of this discussion, a coil shall be treated as one loop through two slots of the armature. However, those skilled in the art will realize that a coil may consist of numerous loops, a single bar, or any other device used in armature winding and still fall within the scope of the present invention.

In FIG. 1A, when a positive voltage is applied to terminal 101 a current flows up the left side of the coil 100 and down the right side of the coil 100 to terminal 102. If the coil would consist of more than one loop, the current would flow up the left side of each loop, and down the right side.

Figure 1B:
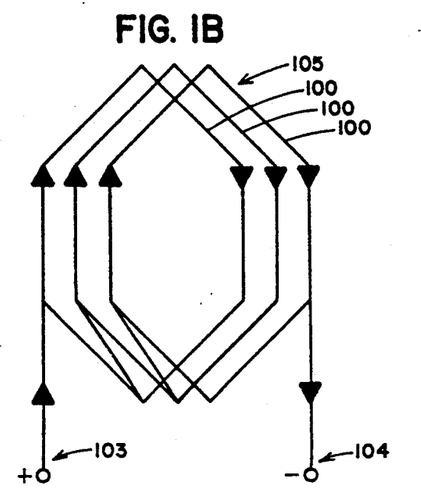
FIG. 1B depicts in diagrammatic linear form multiple coils used to wind an armature.

FIG. 1B represents several coils 100. The coils 100 are collectively referred to as a group of coils 105. Each loop of each coil is connected such that when a positive voltage is applied to terminal 103, current flows up the left side of each coil 100 (and each loop of each coil) and down the right side to terminal 104.

Figure 2A:
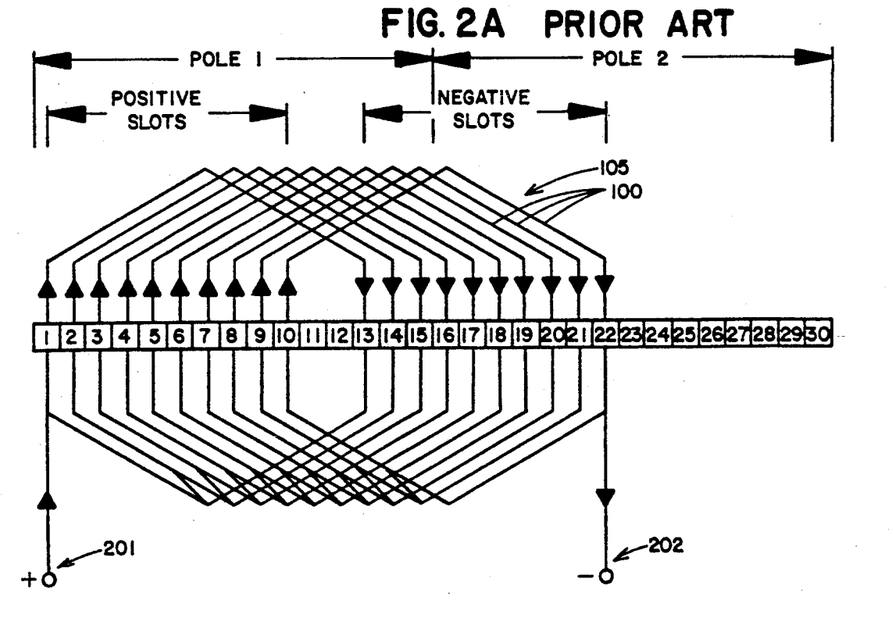
FIG. 2A depicts in diagrammatic linear form the windings on an armature according to the prior art for a two pole electrical machine.

In FIG. 2A, a typical armature winding according to the prior art is shown. The winding comprises a group of coils 105 comprising the coils 100, similar to the coils 100 shown in FIG. 1B. Slots of the armature are represented by reference numeral 203 in FIG. 2A and are numbered 1 through 30. When a positive voltage is applied to terminal 201 the current flows up a first side of each of the coils 100 placed in slots 1-10, and down a second side of each of the coils 100 placed in slots 13-22 to terminal 202. For the purposes of this discussion, the slots are defined such that when a positive voltage is placed at the positive terminal 201, the current flows through a positive slot first, and then through a negative slot. Thus, each coil 100 has a first side placed in one positive slot, and a second side placed in one negative slot. In FIG. 2A, slots 1-10 are positive slots and slots 13-22 are negative slots. The negative and positive slots together form one phase belt. Those skilled in the art realize that in actual practice an alternating current supply may be used and that the current reverses direction. However, at any one time the current is flowing in the same direction in all positive slots and in the opposite direction in all negative slots. The current path for the winding shown in FIG. 2A is 201, 1, 13, 2, 14, 3, 15, 4, 16, 5, 17, 6, 18, 7, 19, 8, 20, 9, 21, 10, 22, 202.

Figure 2B:
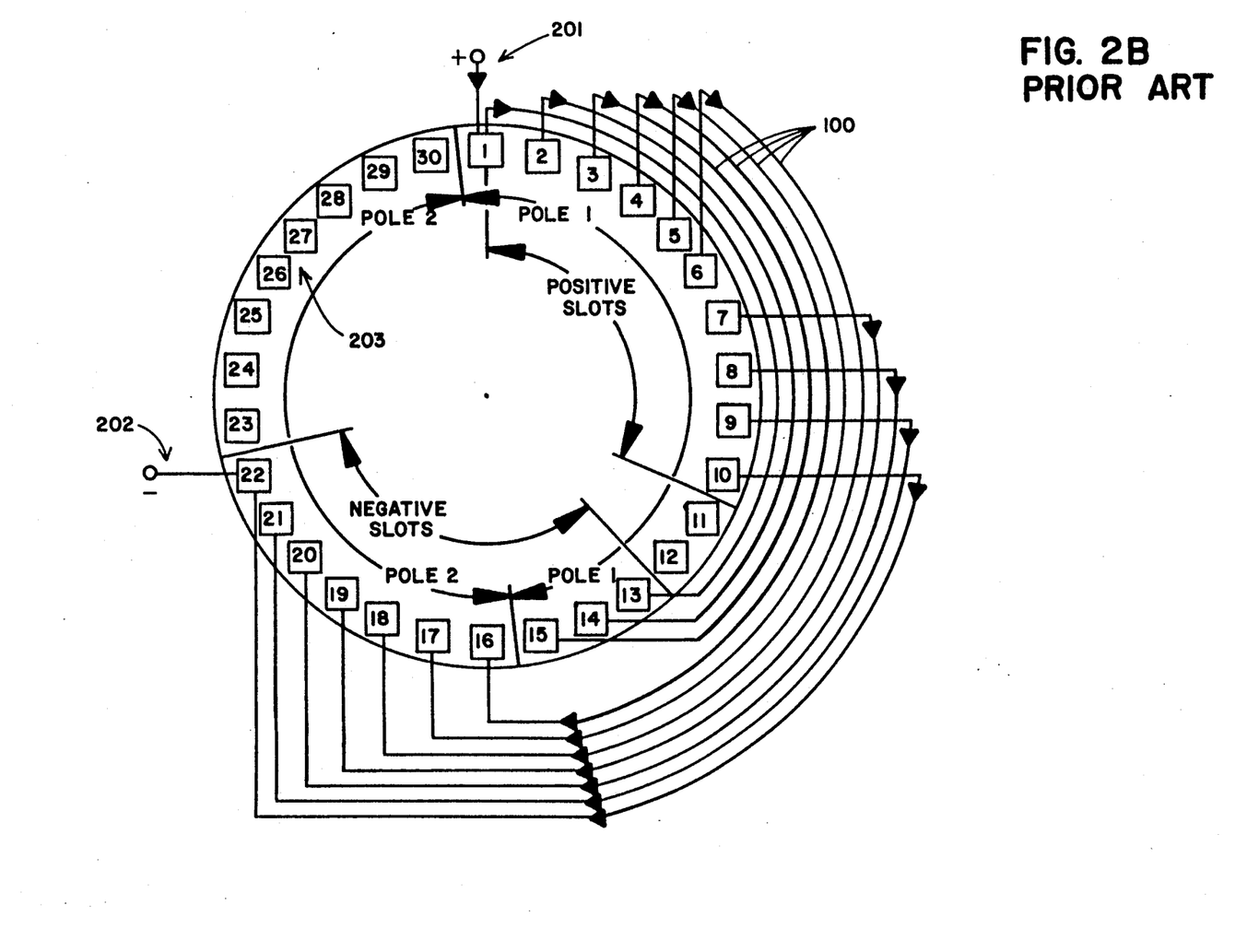
FIG. 2B depicts the same prior art as 2A, but is depicted using a circular representation rather than a linear representation.

FIG. 2B represents the same winding shown in FIG. 2A, however in this view, end turns of the coils 100 cannot be seen. When a positive voltage is applied to terminal 201, current flows from each coil's positive slot to each coil's negative slot to terminal 202.

The armature shown in FIGS. 2A and 2B is a two pole armature, also referred to as a bipolar armature. Each coil has a mechanical and effective span associated with it. The mechanical span of a coil is the number of slots between its corresponding positive slot and negative slot. Thus, the mechanical span of the coils 100 in FIGS. 2A and 2B is twelve (12). The effective span is defined as the number of slots from the first positive slot of the series of sequentially occurring positive slots in the coil group, across the series of positive slots to the first negative slot of the series of sequentially occurring negative slots of that same coil group. In FIGS. 2A and 2B, the effective span is twelve (12).

The prior art shown uses electrical machines having the mechanical span equal to the effective span. The present invention alters the mechanical span without changing the effective span. This has little or no effect on the machine except to increase or decrease the amount of wire necessary to construct the machine.

The current in the portion of the coil that is not in the slot, that is the portion of the coil on the armature connecting the positive and negative slots, also referred to as the end turn, does not substantially affect the flux, and therefore the output voltage is not affected. The $I^2R$ losses are proportional to the length of the wire used, often copper, and therefore are dependent on the mechanical span. From the standpoint of the flux created, the wiring external to the slots does not matter, so long as each slot remains the same polarity. Therefore, changing the mechanical pitch and holding the electrical pitch constant results in a machine whose electrical characteristics do not change, but the amount of wire used is decreased, and the $I^2R$ losses are decreased. There are 15 slots per pole in the winding shown in FIG. 2A. The pitch, defined as the ratio of the effective span to the slots per pole, is equal to 4/5. The pitch and distribution of a winding affects the magnitude of undesirable harmonics, thus it is desirable to maintain the pitch and the slot's polarity.

Figure 3A:
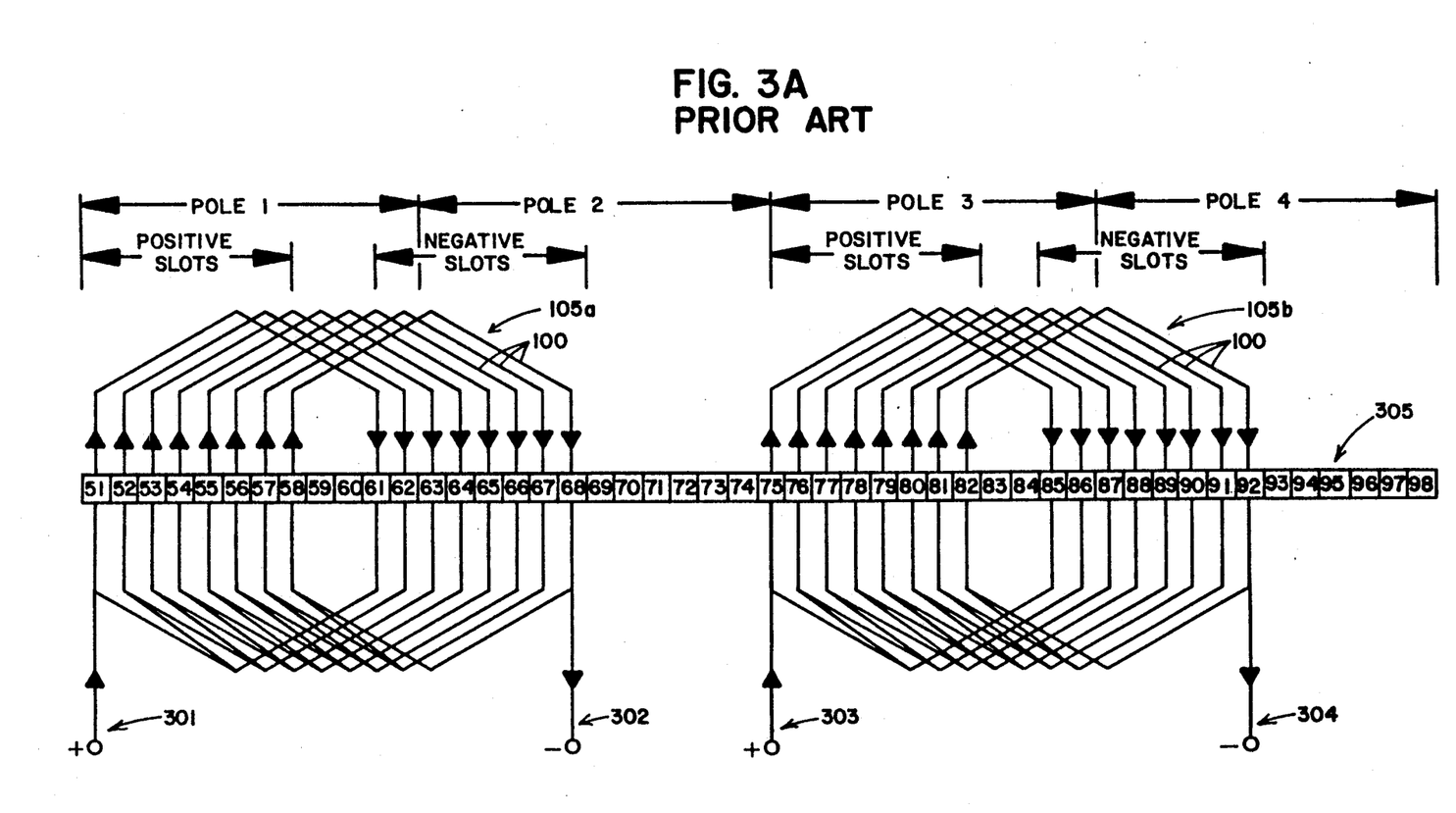
FIG. 3A depicts in diagrammatic linear form the windings on an armature according to the prior art for a four pole electrical machine.
Figure 3B:
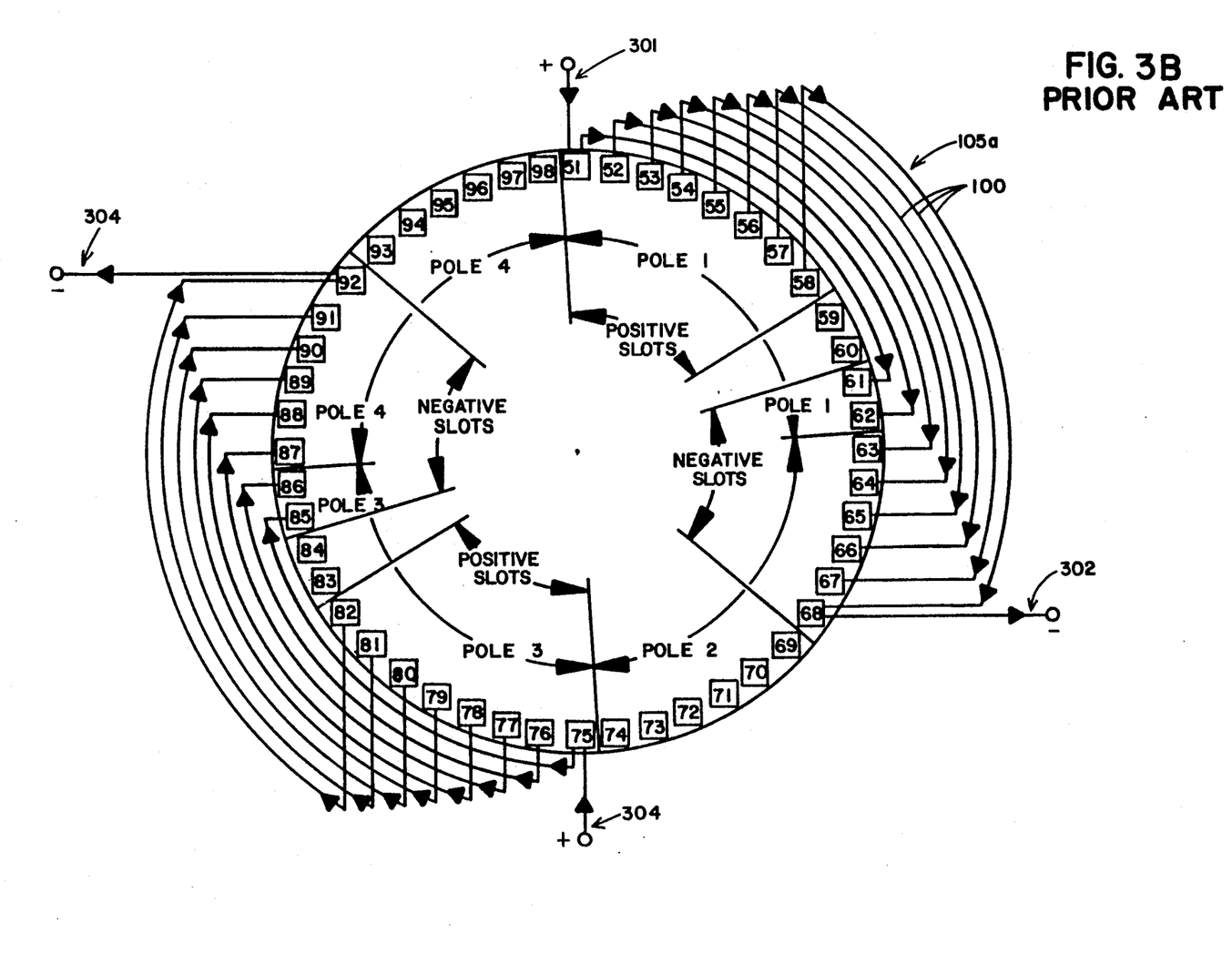
FIG. 3B depicts the same prior art as FIG. 3A, but is depicted using a circular representation rather than a linear representation.

Another example of prior art is shown in FIGS. 3A and 3B. There are two groups of coils 105a,b present. This is a four-pole winding using a 48 slot armature. Slots 51-58 and 75-82 are positive slots, while slots 61-68 and 85-92 are negative slots. Slots 51-68 comprise one phase belt and slots 75-92 comprise a second phase belt. The mechanical and effective span is 10, and the pitch is 5/6. FIG. 3A uses a linear representation and FIG. 3B uses a circular representation. There are two current paths. They are: 301, 51, 61, 52, 62, 53, 63, 54, 64, 55, 65, 56, 66, 57, 67, 58, 68, 302; and 303, 75, 85, 76, 86, 77, 87, 78, 88, 79, 89, 80, 90, 81, 91, 82, 92, 304.

Figure 4A:
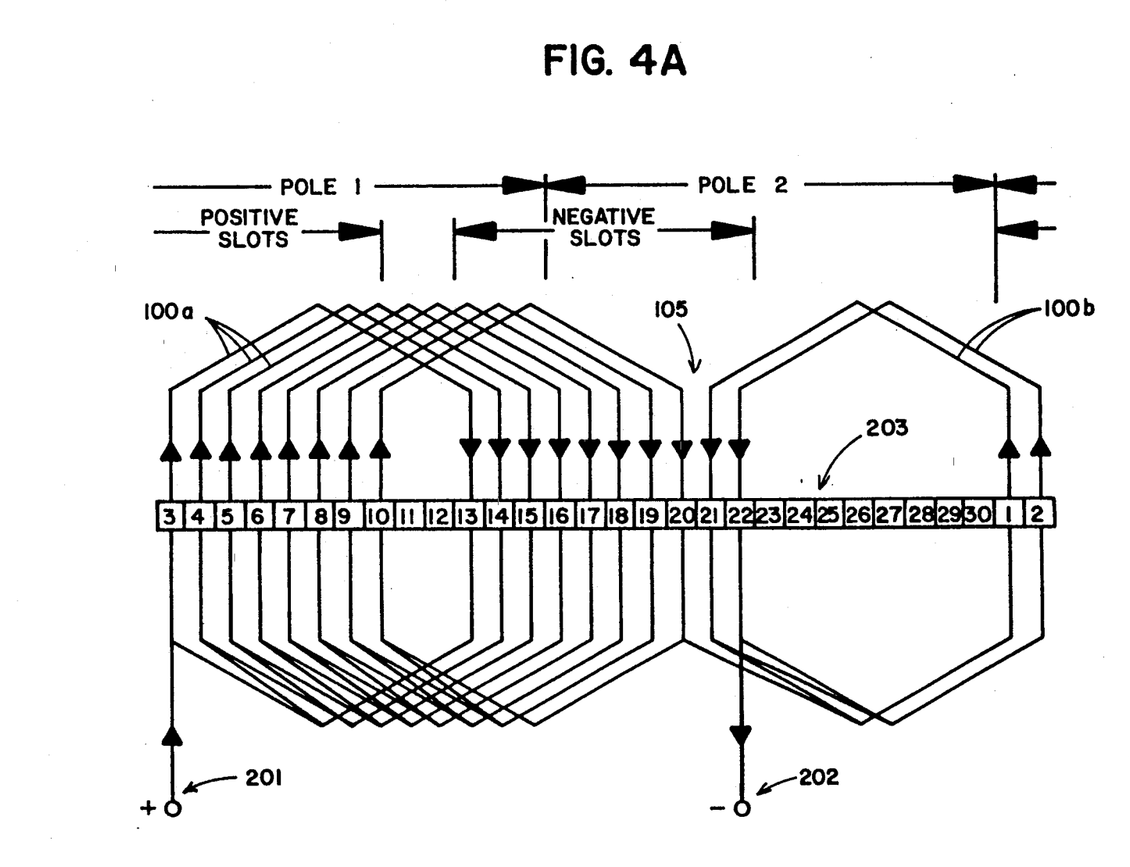
FIG. 4A depicts in diagrammatic linear form an armature winding that provides the same voltage and EMF as that of FIGS. 2A and 2B, but is wound according to the present invention
Figure 4B:
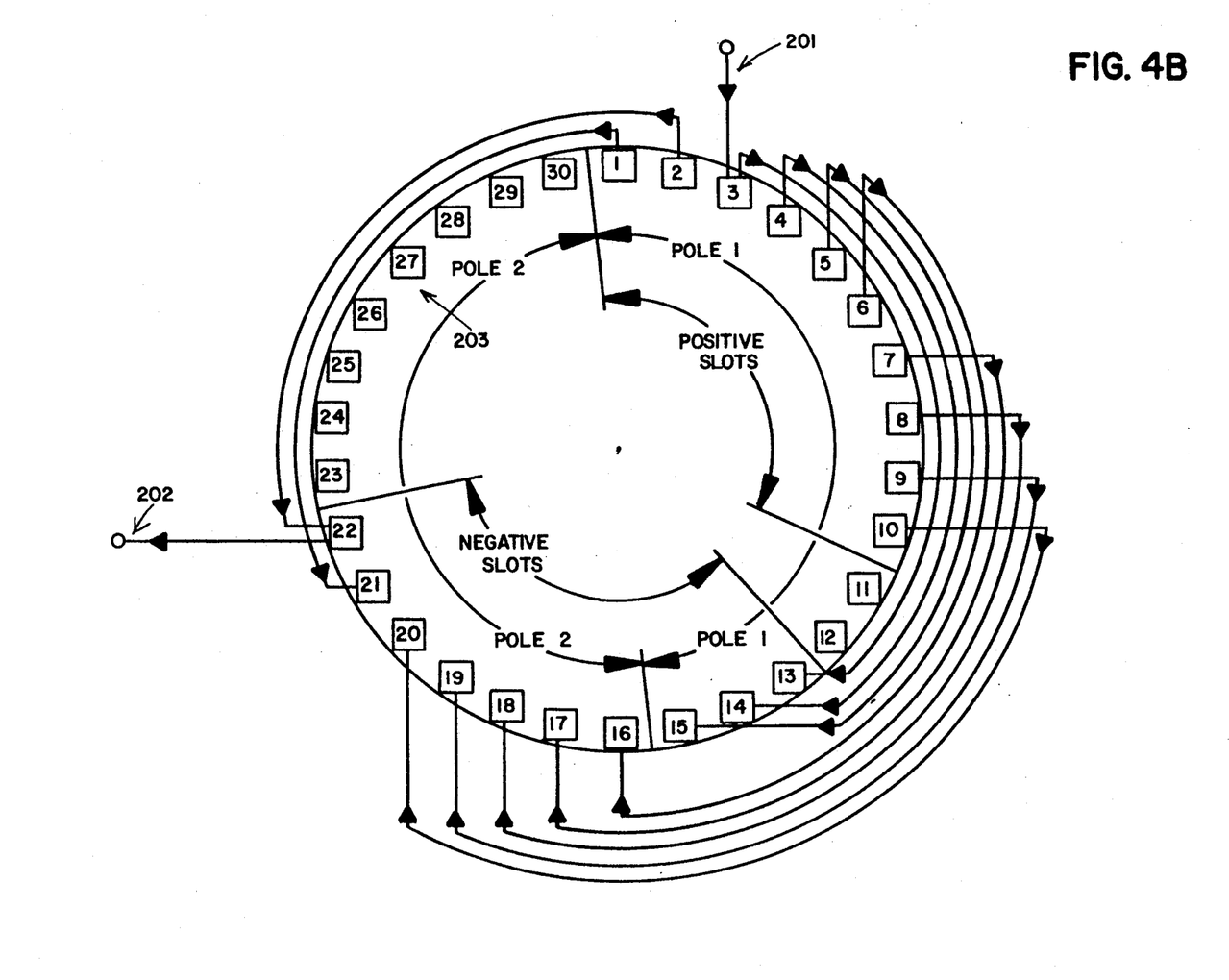
FIG. 4B depicts the same winding as FIG. 4A, but is depicted using a circular representation rather than a linear representation.

In FIGS. 4A and 4B, the winding of FIGS. 2A and 2B is made according to the present invention. The group of coils 105 comprises two different sets of coils 100a, 100b which are wound in different directions. The positive slots in FIG. 4A and 1-10, and the negative slots are 13-22, just as in the winding of FIG. 2A. In this design, the mechanical span is reduced to 10 while the effective span is held at 12. The electrical pitch and distribution of positive/negative slots is the same as FIGS. 2A and 2B. Since the mechanical span is less than that of FIGS. 2A and 2B, less wire is necessary to wind the armature. Decreasing the mechanical span is accomplished by reversing the direction the last two coils 100b are wound. In FIGS. 2A and 2B, the direction from the positive slot to the negative slot for all coils is the same (to the right in FIG. 2A and clockwise in FIG. 2B). This invention uses the novel technique of reversing the direction for two coils. For the eight coils 100a (those in positive slots 3-10) the direction from the positive slot to the negative slot is to the right in FIG. 4A (clockwise in FIG. 4B) and for the remaining two coils 100b in positive slots 1 and 2 the direction from the positive slot to the negative slot is left in FIG. 4A (counterclockwise in 4B).

This "flipping" of two coils reduces the mechanical span and results in using less wire, reducing losses, and increasing efficiency. At the same time, it is possible to maintain each slot as a positive or negative slot as in FIG. 2A. An armature wound according to the present invention uses less wire than the winding according to the prior art and the $I^2R$ losses are also reduced.

Figure 5A:
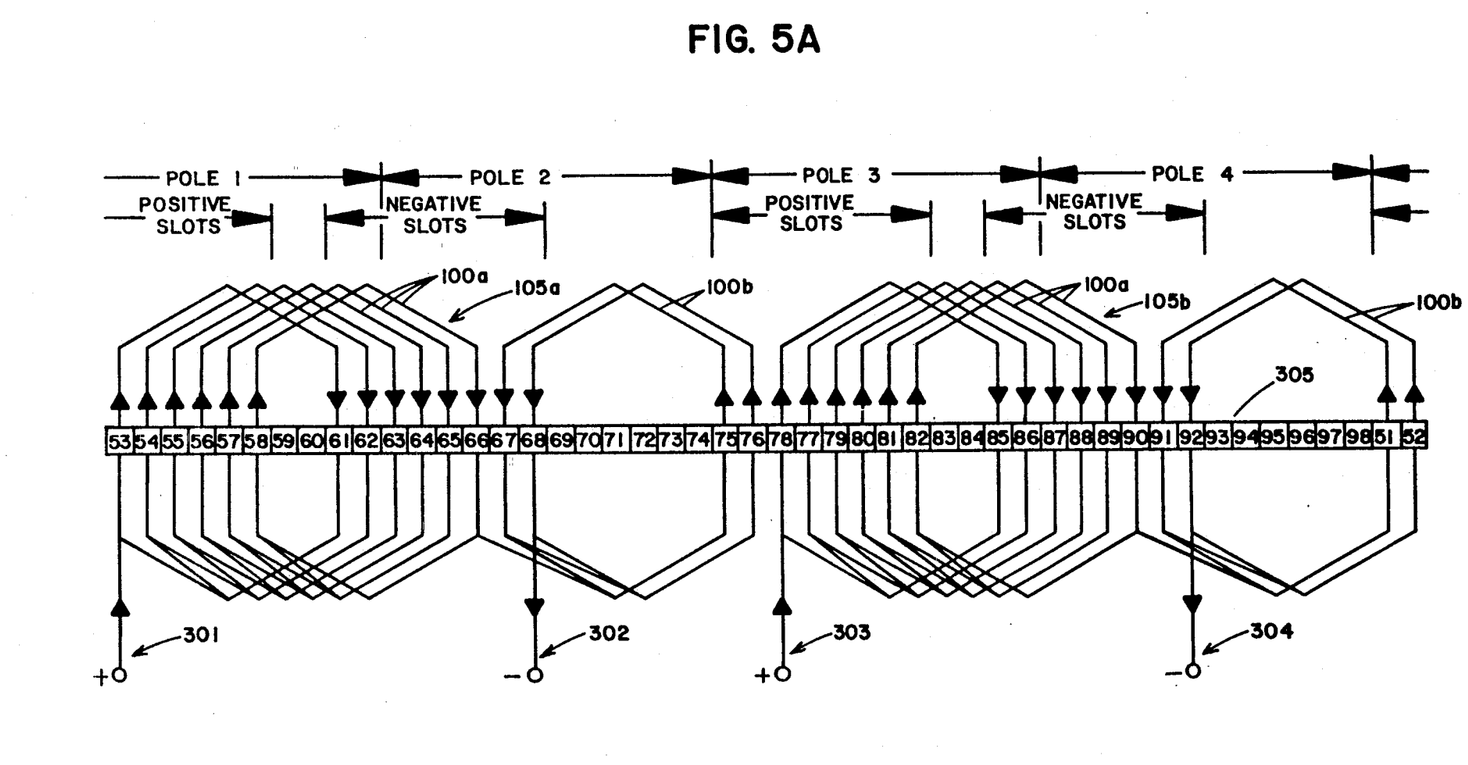
FIG. 5A depicts in diagrammatic linear form an armature winding that provides the same voltage and EMF as that of FIGS. 3A and 3B but is wound according to the present invention.
Figure 5B:
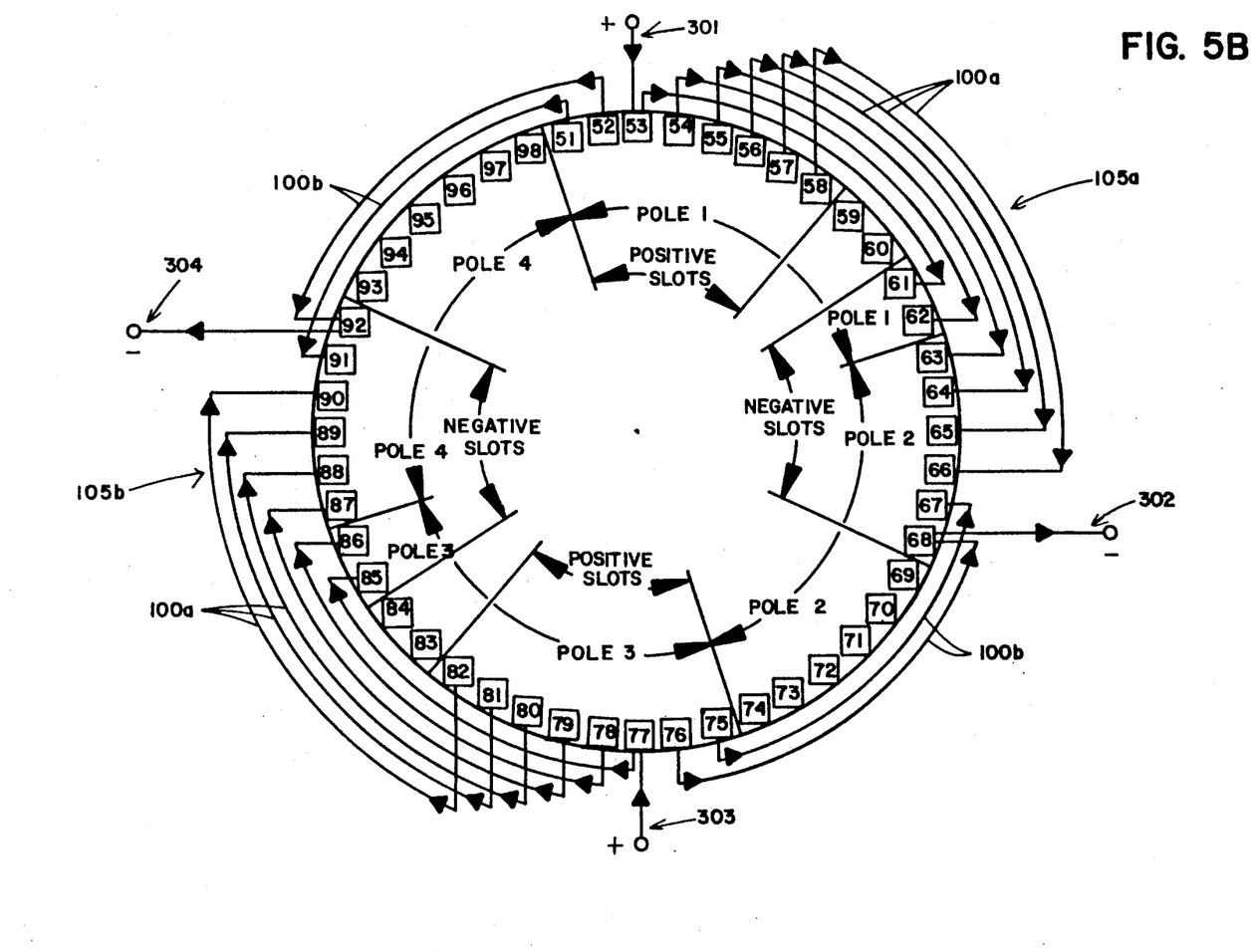
FIG. 5B depicts the same winding as FIG. 5A but is depicted using a circular representation rather than a linear representation.

FIGS. 5A and 5B represent the same winding as that of FIGS. 3A and 3B, except made according to the present invention. The direction from the positive slot to the negative is to the right (or clockwise) except for two coils in each group of coils. The slots are maintained at the polarity of FIGS. 3A and 3B, but the mechanical span is reduced to 8, as opposed to a mechanical span of 10 in FIGS. 3A and 3B.

Figure 6:
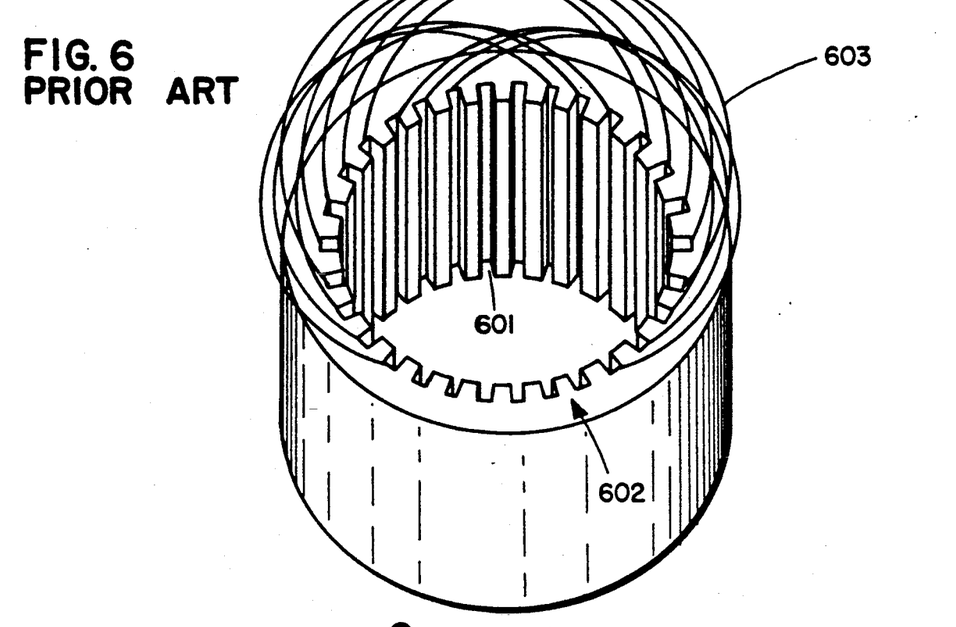
FIG. 6 is a fragmentary partial view of an electrical machine made according to the prior art from a top perspective.
Figure 7:
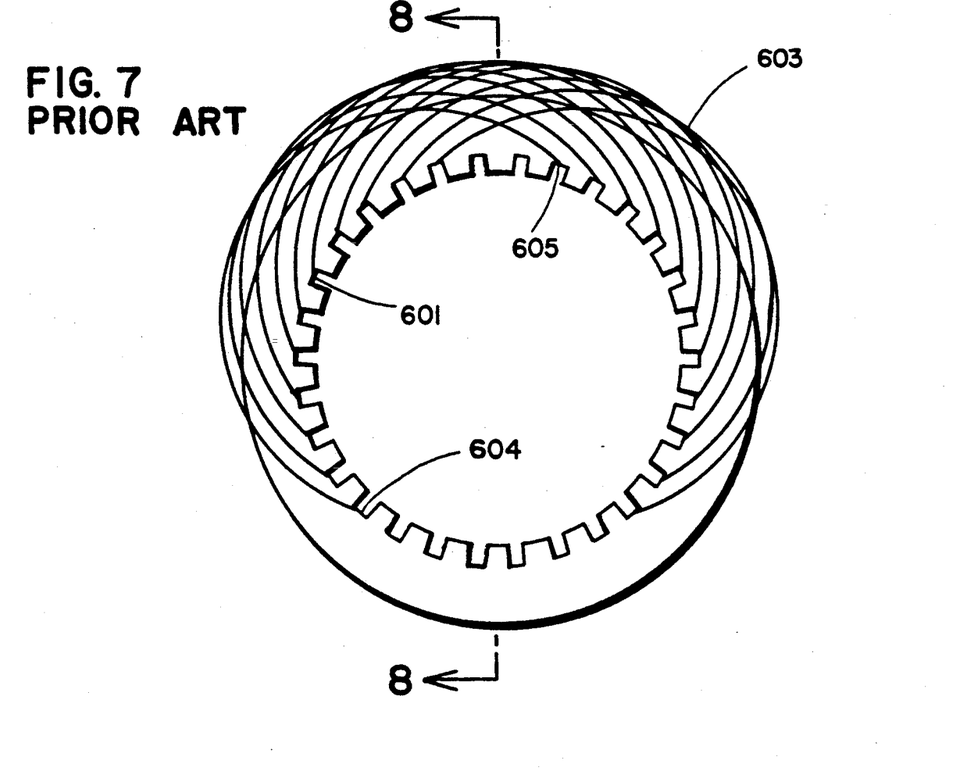
FIG. 7 is a top view of the electrical machine shown in FIG. 6.
Figure 8:
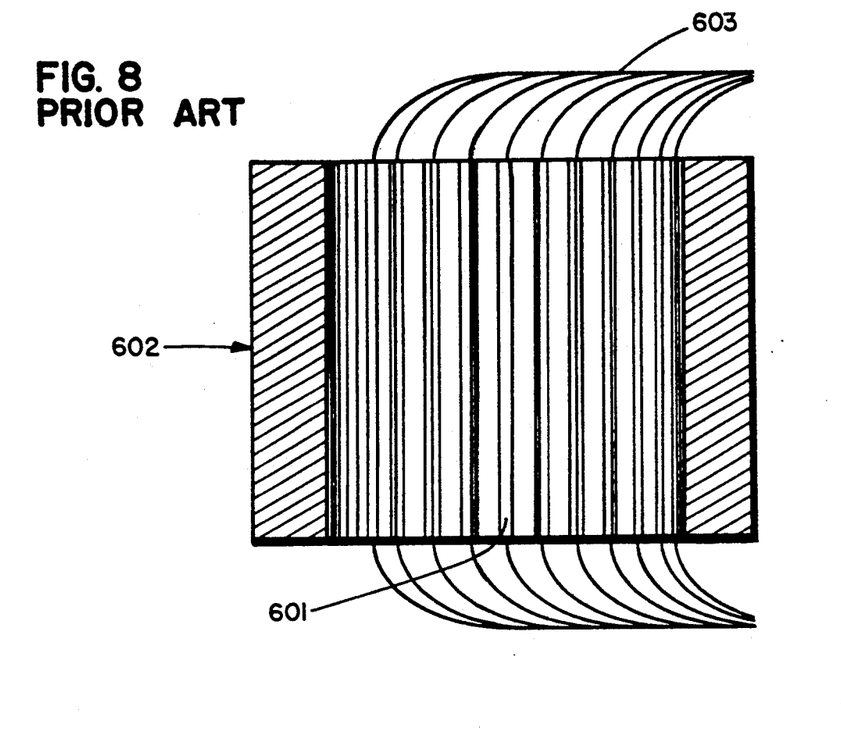
FIG. 8 is a sectional view taken along lines 8—8 of FIG. 7.

FIG. 6 is an exploded perspective of an electrical machine armature (602) made according to the prior art such as shown in FIGS. 2A and 2B. The slots in which the coils are placed are referred to by 601. The portion of the coil in the slots is the portion that contributes to the magnetic flux. The end portions, also referred to as end turns, of the coils are referred to by 603 and do not substantially contribute to the magnetic flux. FIG. 7 shows a top view of the machine in FIG. 6. It is possible to see that every coil is wound in the same direction. It may be seen that the mechanical span and the effective span are 12. FIG. 8 shows a section along line 8—8 of FIG. 7.

Figure 9:
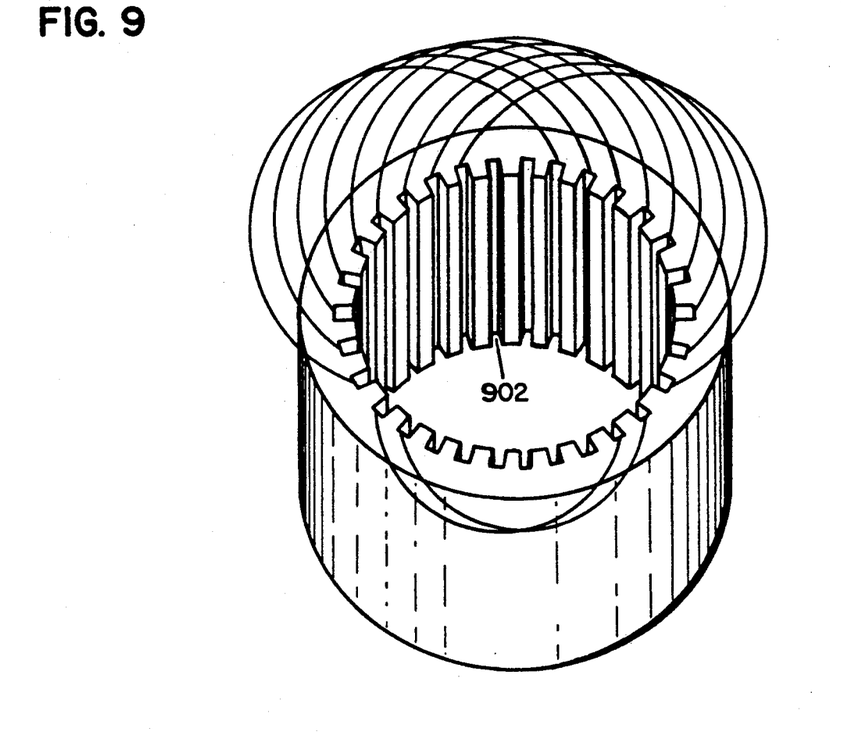
FIG. 9 is a fragmentary partial view of an electrical machine made according to the present invention.
Figure 10:
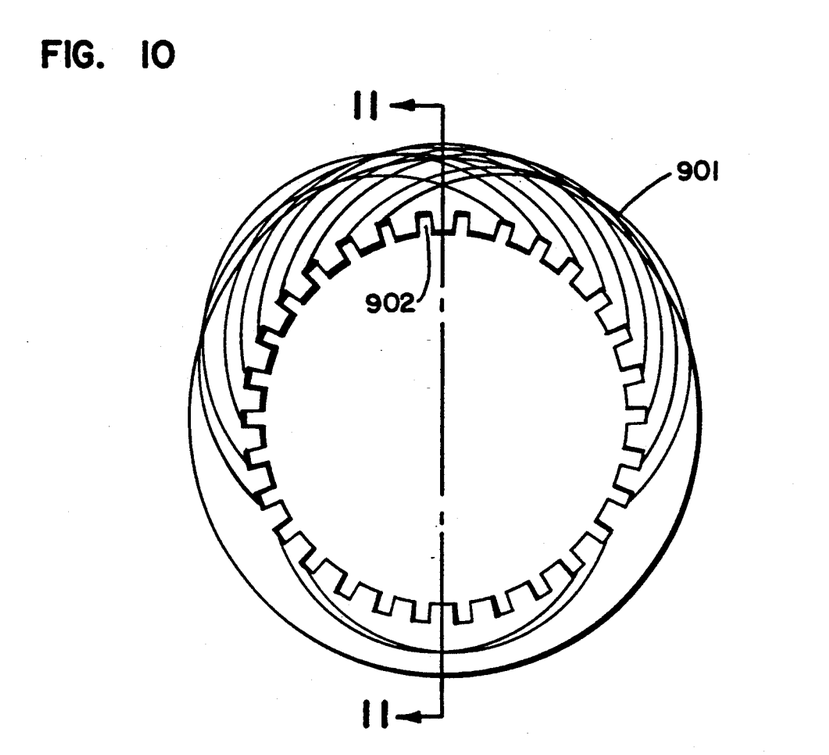
FIG. 10 is a top view of the electrical machine shown in FIG. 9.
Figure 11:
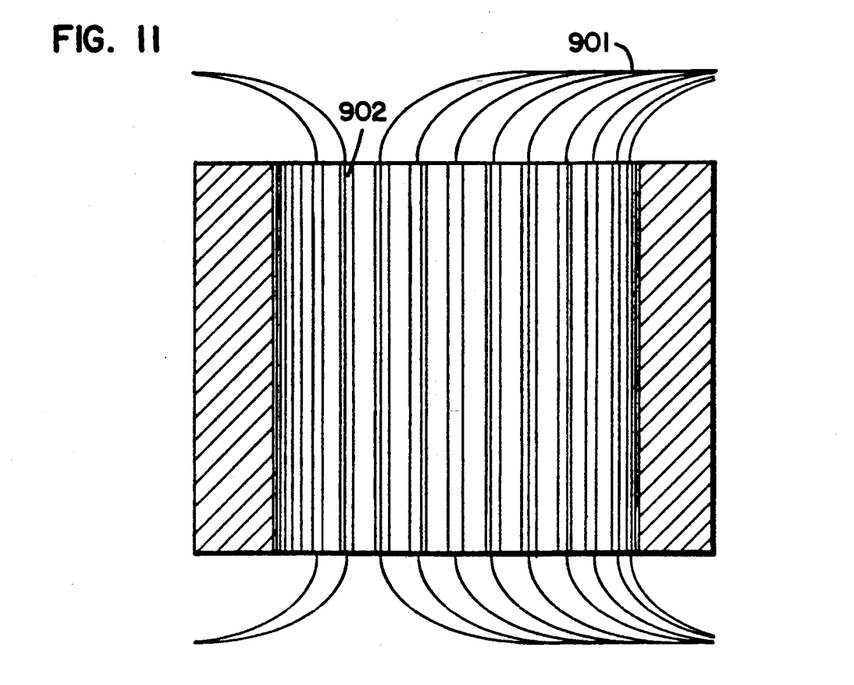
FIG. 11 is a sectional view taken along line 11—11 of FIG. 10.

FIG. 9 is an exploded perspective of an electrical machine armature wound according to the present invention. FIG. 10 is a top view of the machine in FIG. 9. It may be seen that two coils are wound in the direction opposite the others, and that the mechanical span is 10. The effective span is equal to 12, just as in FIG. 7. FIG. 11 shows a section along line 11—11 of FIG. 8.

It is to be understood that even though numerous characteristics and advantages of various embodiments of the present invention have been set forth in the foregoing description, together with details of the structure and function of various embodiments of the invention, this disclosure is illustrative only and changes may be made in detail, especially in matters of shape, size and arrangement of parts, within the principles of the present invention, to the full extent indicated by the broad general meaning of the terms in which the appended claims are expressed.

What is claimed is:

1. A method for winding electrical conductor material to form a group of coils, each coil having a mechanical span, the group of coils being formed for an armature of a 120 degree phase belt electrical machine, wherein the group of coils is defined by a first and second subgroup of coils, and the armature comprises a plurality of slots arranged in a circular pattern and aligned with each other, the method comprising the steps of:
   (a) winding said first subgroup of coils in the slots of the armature in a first direction, to provide for the flow of electrical current therethrough, the mechanical span of each coil of said first subgroup of coils being equal to a first mechanical span;
   (b) winding said second subgroup of coils in the slots of the armature in a second direction, to provide for the flow of electrical current therethrough, the mechanical span of each coil of said second subgroup of coils being equal to said first mechanical span, the group of coils being formed by the first subgroup of coils and the second subgroup of coils being electrically equivalent to an alternative group of coils having the same number of coils all wound in the same direction with the coils having equal mechanical spans, and the first mechanical span of each coil of the group formed by the first subgroup of coils and the second subgroup of coils further being less than the mechanical span of each coil of the alternative group of coils, whereby less electrical conductor material is required to form the group of coils than is required to form the alternative groups of coils; and
   (c) winding the group of coils such that each slot has electrical current flowing in a single direction therethrough.

2. A method in accordance with claim 1 wherein:
   (a) the step of winding said first subgroup of coils in the slots of the armature in said first direction further includes the steps of;
      (i) disposing a first side of a first coil of said first subgroup of coils in a first positive slot and disposing a second side of said first coil of said first subgroup of coils in a first negative slot; whereby the mechanical span of said first coil of said first subgroup of coils is equal to said first mechanical span;
      (ii) disposing a first side of each subsequent coil of said first subgroup of coils in a positive slot adjacent to a positive slot in which a prior coil was disposed; and
      (iii) disposing a second side of each subsequent coil o said first subgroup of coils in a negative slot adjacent to a negative slot in which said prior coil was placed; whereby the mechanical span of each subsequent coil of said first subgroup of coils is equal to said first mechanical span; and
   (b) the step of winding said second subgroup of coils in the slots of the armature in said second direction further includes the steps of;
      (i) disposing a first side of a first coil of said second subgroup of coils in a second positive slot and disposing a second side of said first coil of said second subgroup of coils in a second negative slot; whereby the mechanical span of said first coil of said second subgroup of coils is equal to said first mechanical span;
      (ii) disposing a first side of each subsequent coil of said second subgroup of coils in a positive slot adjacent to a positive slot in which a prior coil was disposed; and
      (iii) disposing a second side of each subsequent coil of said second subgroup of coils in a negative slot adjacent to a negative slot in which said prior coil was placed; whereby the mechanical span of each subsequent coil of said second subgroup of coils is equal to said first mechanical span.

3. A method in accordance with claim 2 wherein:
   (a) the step of winding said first subgroup of coils includes winding only eight coils and disposing said second side of said first coil of said first subgroup of coils in a slot disposed ten slots from said first positive slot; and
   (b) the step of winding said second subgroup of coils includes winding only two coils and disposing said second side of said first coil of said second subgroup of coils in a slot disposed ten slots from said second positive slot.

4. A method in accordance with claim 2, wherein:
   (a) the step of winding said first winding said first subgroup of coils includes winding only six coils and disposing said second side of said first coil of said first subgroup of coils in a slot disposed eight slots from said first positive slot; and
   (b) the step of winding of said second subgroup of coils includes winding only two coils and disposing said second side of said first coil of said second subgroup of coils in a slot disposed eight slots from said second positive slot.

5. A method in accordance with claim 1 wherein the electrical span of said group of coils differs from said first mechanical span.

* * * * *

UNITED STATES PATENT AND TRADEMARK OFFICE
CERTIFICATE OF CORRECTION

PATENT NO. : 5,018,676

DATED : May 28, 1991

INVENTOR(S) : Gulbrandson

It is certified that error appears in the above-identified patent and that said Letters Patent is hereby corrected as shown below:

In Column 6, line 16, Claim 2, delete "o" and insert --of--.

In Column 6, line 53, Claim 4, delete "winding said first" after the first occurrence of "first".

Signed and Sealed this

Thirteenth Day of December, 1994

Attest:

BRUCE LEHMAN

*Attesting Officer*    *Commissioner of Patents and Trademarks*